(12) United States Patent
Schramm et al.

(10) Patent No.: US 6,250,587 B1
(45) Date of Patent: Jun. 26, 2001

(54) PRESSURE SENSITIVE ADHESIVE FOR MOUNTING A DEICER AND METHOD FOR MOUNTING THEREOF

(75) Inventors: Kevin Christopher Schramm, Strongsville; Meighan Kelly Altwies, Dayton, both of OH (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/136,810

(22) Filed: Aug. 19, 1998

(51) Int. Cl.$^7$ .................................................. B64D 15/00
(52) U.S. Cl. .................................. 244/134 R; 244/134 D
(58) Field of Search ........................... 244/134 R, 134 A, 244/134 D; 428/40.1, 353, 343

(56) References Cited

U.S. PATENT DOCUMENTS

| | | | |
|---|---|---|---|
| 2,757,273 | * | 7/1956 | Taylor . |
| 2,762,897 | * | 9/1956 | Vrooman et al. . |
| 2,889,038 | * | 6/1959 | Kalleberg . |
| 2,957,662 | * | 10/1960 | Hess . |
| 3,092,250 | * | 6/1963 | Knutson et al. . |
| 4,494,715 | * | 1/1985 | Weisend . |
| 4,875,644 | * | 10/1989 | Adams et al. . |
| 5,709,918 | * | 1/1998 | Kimijima et al. . |

FOREIGN PATENT DOCUMENTS 0 720 946 A1    7/1996   (EP) .

OTHER PUBLICATIONS

BFGoodrich Aerospace, "74–451–AA Universal Cold Patch Repair Kit, Ice Protection Systems Acquires Lucas Product Line", Sep. 8, 2000, 3 pages.

\* cited by examiner

Primary Examiner—Charles T. Jordan
Assistant Examiner—Tien Dinh
(74) Attorney, Agent, or Firm—Richard A. Romanchik; Renner Otto Boisselle & Sklar (57) ABSTRACT

The invention relates to the field of deicers for inhibiting atmospheric ice accumulation on aircraft structures. More particularly, the invention relates to the bonding of a deicer to an aircraft structure. According to an aspect of the invention, a device for inhibiting atmospheric ice accumulation on an aircraft structure is provided comprising a deicer, and a pressure sensitive adhesive layer that defines a bonding surface that bonds the deicer to the aircraft structure, and wherein the deicer and aircraft surface are primed before application of the pressure sensitive adhesive layer.

15 Claims, 3 Drawing Sheets

PRESSURE SENSITIVE ADHESIVE FOR MOUNTING A DEICER AND METHOD FOR MOUNTING THEREOF

BACKGROUND OF THE INVENTION

The invention relates to the field of deicers for inhibiting atmospheric ice accumulation on aircraft structures. More particularly, the invention relates to the bonding of a deicer to an aircraft structure.

Atmospheric ice accumulation on the ground and in flight has long been recognized as a serious hazard. Various deicing and anti-icing devices have been developed to safely remove or prevent unwanted ice accumulations on the external surfaces of aircraft. Many of these devices comprise deicers that are bonded to existing external surfaces using a removable adhesive. A deicer based on this concept may thus be removed and replaced if it fails or becomes damaged. A very common adhesive used for this purpose is catalogue number 1300L available from the Minnesota Mining and Manufacturing Company, St. Paul, Minn., U.S.A. Previous deicers that have been applied in this manner include elastomeric pneumatic deicers, elastomeric electrothermal deicers and anti-icers, and some electromechanical deicers.

Installation of a deicer using an adhesive such as 1300L involves applying the adhesive to the aircraft structure and to a bonding surface of the deicer. The adhesive is permitted to dry and then activated by wiping it with a solvent such as toluene or methyl-ethyl-ketone (MEK). The adhesive behaves as a contact adhesive, and the deicer is then pressed against the aircraft structure beginning with a selected area (such as a leading edge) and subsequently with increasing distance from the selected area. Rollers are preferably used to insure intimate contact between the two adhesive layers.

In spite of the widespread acceptance of this prior technique, a more durable adhesive interface between the deicer and the aircraft structure is generally desired. The adhesive interface must withstand attacks of sun, rain, deicing fluids, hydraulic fluids, turbine oils, and other degrading elements. In addition, prior commonly used adhesives have a very limited shelf life, and often contain toluol and MEK, as well as other potentially toxic chemicals. Various government agencies have placed severe restrictions on methods of shipping these adhesives, and on how the adhesives and solvents may be used. Finally, prior adhesives require several hours to cure before the deicers may be activated. Imposing several hours downtime on commercial operators is undesirable.

Though prior adhesives are certainly safe and suitable for attaching deicers to aircraft structures, an improved adhesive for this special purpose is desired. In particular, a strong and durable adhesive with good environmental resistance is generally desired. An adhesive having longer shelf life, and not containing or requiring use of solvents in the field is generally desired. Finally, an adhesive that bonds a deicer in a manner that accommodates minimum downtime is desired. The specific problem at hand is to provide a self-adhering deicer having the enumerated adhesive characteristics.

SUMMARY OF THE INVENTION

According to an aspect of the invention, a device is provided for inhibiting atmospheric ice accumulation on an aircraft structure, comprising a deicer and a pressure sensitive adhesive layer for bonding the deicer to the aircraft structure.

The invention provides a self-adhering deicer having a strong and durable adhesive with good environmental resistance. It provides an adhesive having longer shelf life than prior adhesives, and that requires less solvents in the field. Finally, the invention provides an adhesive that bonds a deicer in a manner that allows the deicer to be operated after minimal downtime.

DETAILED DESCRIPTION

Figure 1:
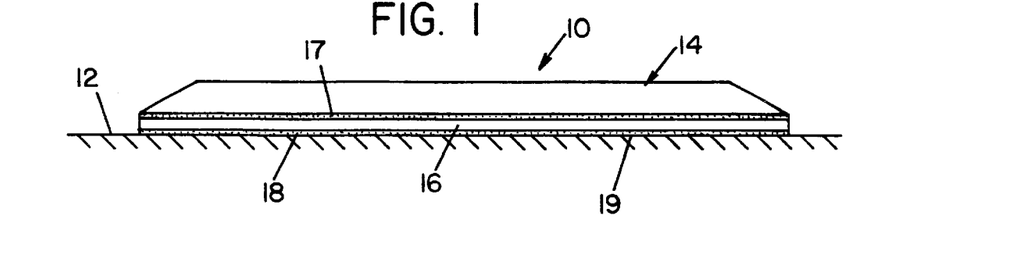
FIG. 1 depicts a device for inhibiting atmospheric ice accumulation on aircraft structure according to the invention.
Figure 2A:
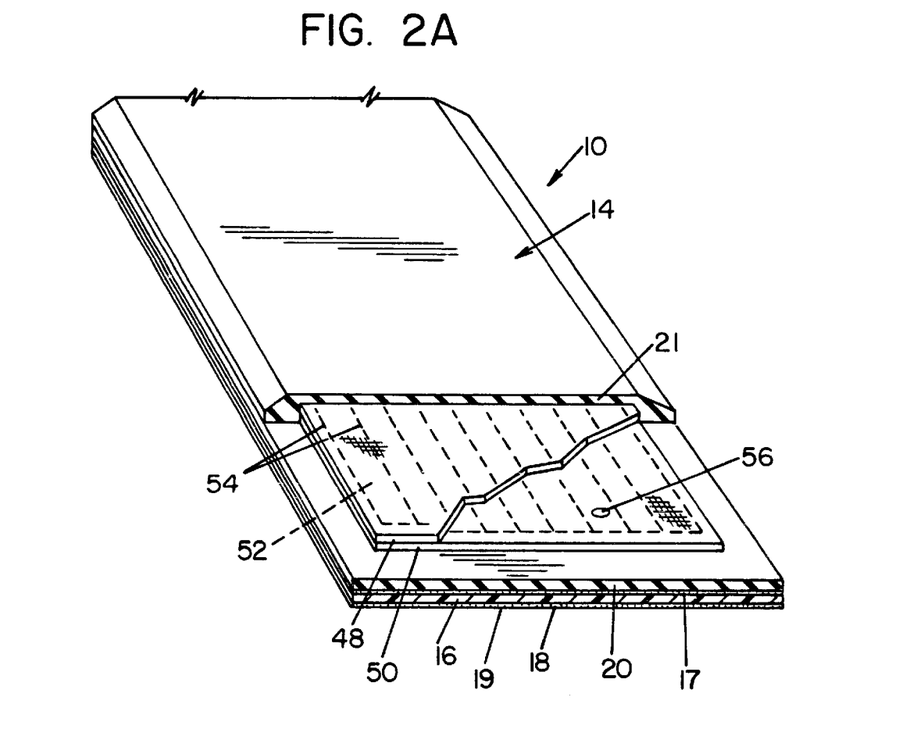
FIG. 2A depicts a pneumatic deicer embodiment according to an aspect of the invention.
Figure 2B:
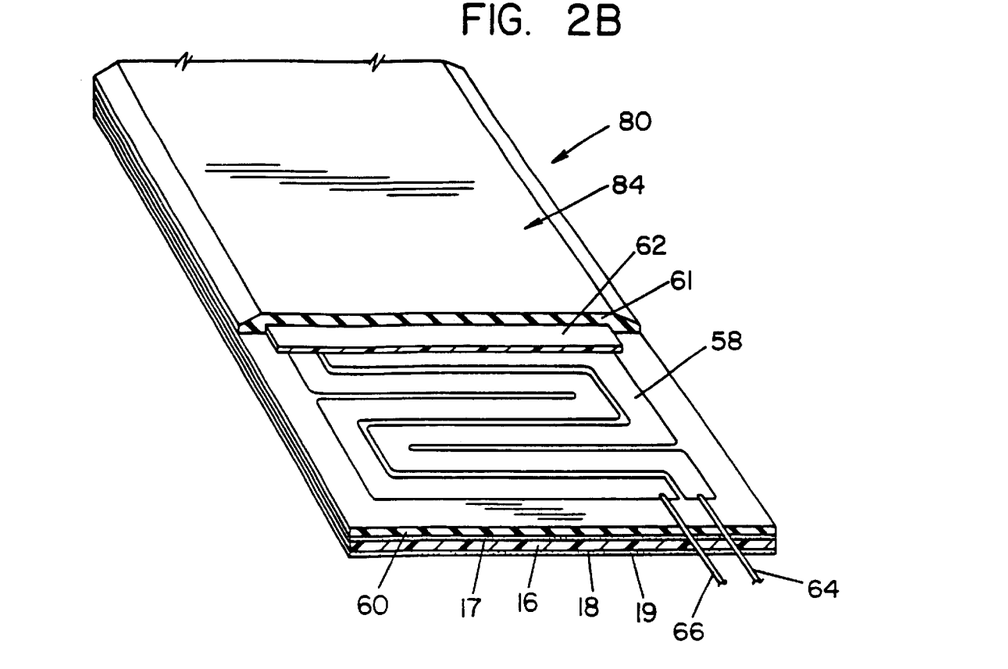
FIG. 2B depicts an electrothermal embodiment according to an aspect of the invention.
Figure 2C:
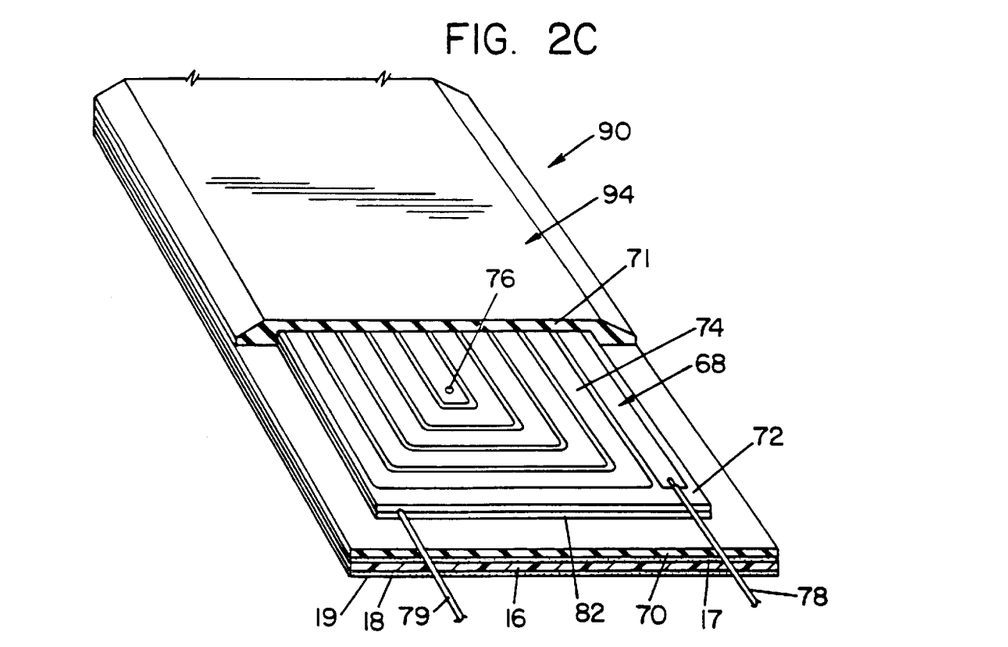
FIG. 2C depicts an electromechanical embodiment according to an aspect of the invention.
Figure 3:
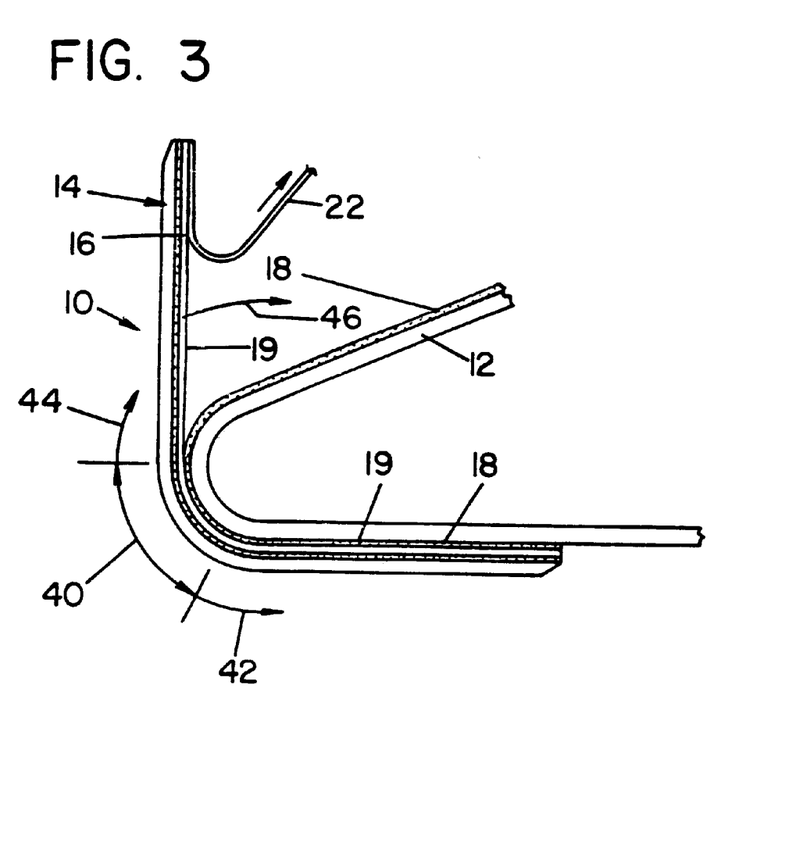
FIG. 3 depicts a method of installing a deicer according to an aspect of the invention.

Various embodiments of the invention are depicted in FIGS. 1–3, wherein like numerals are employed to designate like or corresponding parts. Referring to FIG. 1, a device 10 according to an aspect of the invention for inhibiting atmospheric ice accumulation on an aircraft structure 12 comprises a deicer 14, a pressure sensitive adhesive (PSA) layer 16 for bonding the deicer 14 to the aircraft structure 12, a first primer layer 17 between the deicer 14 and the PSA layer 16, and a second primer layer 18 between the PSA layer and the aircraft structure 12. The pressure sensitive adhesive layer 16 defines a bonding surface 19 that bonds to the aircraft structure 12. The aircraft structure 12 may be constructed from a metal, such as aluminum, or a fiber reinforced plastic. As previously described, prior rubber based adhesives used to bond deicers utilize solvents such as toluene and methyl-ethyl-ketone (MEK), and eliminating or minimizing the use of such solvents is environmentally desirable. As used herein, "pressure sensitive adhesive" means an adhesive that bonds to a surface upon application of pressure without the use of solvents to apply or activate the adhesive, and includes one or two-sided adhesive transfer tape. Various examples of suitable adhesives are provided in the following description. The pressure sensitive adhesive layer 16 eliminates the need for rubber and solvent based adhesives. In addition, the pressure sensitive adhesive facilitates installing the deicer 10 in the field.

Referring now to FIG. 2A, a more detailed view of the device 10 and deicer 14 is presented with sections broken away. In this embodiment, the deicer 14 comprises a pneumatic deicer. Pneumatic deicers have inflatable passages that are inflated causing the surface to distort and break an accreted ice cap into pieces where it is swept away by a surrounding airflow. Pneumatic deicers are very well known in the art. Two variations are generally recognized. One variation, a "sewn-type" pneumatic deicer, is depicted in FIG. 2A. An extensible fabric layer 48 is disposed over an adjacent fabric layer 50. The fabric layers 48 and 50 are sewn together in a manner that defines a plurality of inflatable passages 52. The individual stitches 54 are represented schematically in FIG. 2A. The sewn fabric layers 48 and 50 are bonded between an elastomeric breeze-side layer 21 and an elastomeric bond-side layer 20. The breeze-side layer 21 is exposed to atmospheric icing during flight in atmospheric icing conditions. Pressurized air is periodically supplied to the inflatable passages 52 through an air connection 56, which causes the breeze-side layer 21 to distend and fracture accumulated ice. The individual tubes may run parallel to either the chordwise or spanwise directions of an airfoil section. An example of a sewn-type deicer having tubes running in both the spanwise and chordwise directions is provided in U.S. Pat. No. 4,494,715 to Weisend, Jr., hereby fully incorporated herein by reference.

The second variation, a "tube-type" pneumatic deicer (not shown), may also be used in the practice of the invention. According to the tube-type deicer, the individual inflatable passages are defined by strips of extensible fabric that are rolled across the width of each strip forming a seam along the length of the tube. The tubes (substituted for fabric layers 48 and 50 of FIG. 2A) are then aligned parallel to each other and bonded between elastomeric layers similar to layers 20 and 21. Air is supplied to the tubes through one or more manifolds that run generally perpendicular to the tubes. One or more air connections supply air to each manifold. The individual tubes may run parallel to either the chordwise or spanwise directions of an airfoil section. An example of a tube-type deicer having spanwise tubes is presented in U.S. Pat. No. 3,604,666 to Achberger, and an example of a tube-type deicer having chordwise tubes is presented in U.S. Pat. No. 2,957,662 to Hess, both of which are hereby fully incorporated herein by reference. Suitable materials for tube-type or sewn-type pneumatic deicers are well known in the art and include chloroprene elastomer, polyurethane elastomer, natural rubber, and most preferably neoprene. Square woven and tricot woven nylon fabrics coated with these materials are also used.

The deicer may take many forms in the practice of the invention. Referring to FIG. 2B, a device 80 according to another aspect of the invention comprises a deicer 84 bonded to the pressure sensitive adhesive layer 16 which is bonded to the aircraft structure. In this embodiment, the deicer 84 comprises an electrothermal heating element 58. Heating element 58 is usually bonded to a carrier layer 62. In the embodiment presented, element 58 comprises a sheet metal ribbon disposed in a serpentine-like configuration on carrier layer 62. As is known in the art, element 58 may be etched on the carrier layer 62 using a photographic process. The element 58 and carrier layer 62 are sandwiched between a bond-side layer 60 and a breeze-side layer 61. The breeze-side layer 61 is exposed to atmospheric icing during flight in atmospheric icing conditions. An electrical potential is applied across power leads 64 and 66 that are attached to element 58. The potential develops a current in element 58 which acts as an electrical resistor and generates heat. The heat conducts through the breeze-side layer and melts accumulated ice. Electrothermal deicers and anti-icers that utilize such heating elements are very well known in the art. The bond-side layer 60, breeze-side layer 61, and carrier layer 62 are preferably formed from polymeric material which may or may not be fiber reinforced. Examples of suitable polymeric materials include chloroprene elastomer, nitrile-phenolic plastic, and polyurethane elastomer. Examples of suitable fiber reinforcements include polyester, carbon or graphite, and polyamide (Nylon or Kevlar) fibers, as well as natural fibers such as cotton. A propeller deicer having a ribbon element that may be used in the practice of the invention is described in U.S. Pat. No. 4,386,749 to Sweet et al., hereby fully incorporated herein by reference. Other types of heating elements known in the art, including wire elements and conductive layers, may also be used in the practice of the invention. The opposite currents generate opposing electromagnetic fields which causes the two coils to forcefully repel each other. This type of arrangement is generally known in the art as an "electro-repulsive deicer." Examples of electro-repulsive deicers that may be used in the practice of the invention are presented in the '480 patent.

An alternative embodiment of an electro-repulsive deicer that may be used in the practice of the intention is presented in U.S. Pat. No. 4,875,644 to Adams et al. Other devices known in the art similar to those discussed in relation to FIGS. 2A through 2C may also be used in the practice of the invention. It is not intended to limit the invention to the specific embodiments presented since the invention may be used with any type of deicer.

Referring again to FIG. 1, the thickness of PSA layer 16 is preferably within the range from about 0.002 inch to about 0.045 inch, with a thickness of about 0.010 inch being most preferred. The thickness of primer layers 17, 18 is preferably within the range from about 0.001 inch to about 0.005 inch, with a thickness of about 0.002 inch being most preferred. A peel strength of at least 12–15 piw (pounds per inch width) is desired between the deicer 14 and the aircraft structure 12 when tested according to ASTM D 1676-93 "Standard Test Method for Peel Resistance of Adhesives (T-peel Test)" with one inch by six inch samples having a one inch unbonded area at one end in order to provide a starting point for the peel. The primer layers 17, 18 and pressure sensitive adhesive 16 are chosen to obtain the desired peel strength.

A suitable pressure sensitive adhesive may be selected from the group consisting of acrylic pressure sensitive adhesive and rubber based pressure sensitive adhesive. These adhesives share a common property in having suitable bond strengths and environmental resistance. The pressure sensitive adhesive layer 16 may include a support film, such as polypropylene or polyester support film. Suitable acrylic pressure sensitive adhesives include catalogue number F-9473PC available from the Minnesota Mining and Manufacturing Company, St. Paul, Minn., U.S.A.; catalogue number FasTape 1165 UHA available from Avery Denison, Painesville, Ohio, U.S.A.. Suitable rubber based pressure sensitive adhesives include catalogue number IB-1200 available from the Morgan Adhesives Company, Stow, Ohio, U.S.A., and catalogue number ARclad☐ S-6450 available from Adhesives Research, Inc. Other pressure sensitive adhesives having similar properties may also be used in the practice of the invention.

The primer layers 17, 18 are utilized to provide an enhanced adhesive bond between the PSA layer 16 and the deicer 14 and the PSA layer 16 and the aircraft structure 12. The preferred primer for the present invention is TAPE PRIMER 94 available from 3M, which contains cyclohexane, xylene, ethyl alcohol, ethyl benzene, ethyl acetate, acrylic polymer and chlorinated polyethylene.

Referring now to FIG. 3, a method of installing a device 10 (FIG. 2B) according to an aspect of the invention is presented. The device 10 is preferably provided with the pressure sensitive adhesive layer 16 already bonded to the deicer 14, and with a release layer 22 bonded to the bonding surface 19 of pressure sensitive adhesive layer 16. According to a preferred method, the deicer 14 is prepared for application of the pressure sensitive adhesive layer 16 in the following manner. The bottom surface of the deicer is first scrubbed with a solvent (e.g. toluene or MEK) soaked cloth. Then the surface is wiped with a cloth soaked in ethyl alcohol. Then the surface is brush coated with the primer layer 17 and allowed to dry for approximately 5 minutes. Lastly, the pressure sensitive adhesive is applied to the deicer.

The deicer can be stored for use with the PSA installed so long as the release layer 22 is provided on bonding surface 19 of the PSA. The release layer 22 is removed immediately before bonding the bonding surface 19 to the aircraft structure 12. According to a preferred method of deicer installation, the aircraft surface is preferably prepared for deicer installation by first scrubbing the surface clean with a cloth soaked in a solvent, such as toluene or MEK, and then wiping the surface with another solvent, such as ethyl alcohol. The primer layer 18 is then applied to the aircraft surface and allowed to air dry for approximately 5 minutes. The device 10 is bonded to the aircraft structure 12 by first pressing a selected area 40 of the bonding surface 19 (pressure sensitive adhesive) against the aircraft structure 12 and subsequently pressing the bonding surface 19 against the aircraft structure 12 with increasing distance from the selected area 40. In such manner, the bonding surface 19 is first bonded to the aircraft structure 12 in the selected area 40. In the example presented, one side of the deicer 14 has already been pressed against the aircraft structure 12 with increasing distance from the selected area 40 in the direction of arrow 42. The other side of the deicer will be forced against the aircraft structure 12 in the direction of arrow 46 as the deicer 14 is pressed against the aircraft structure 12 with increasing distance from selected area 40 in the direction of arrow 44. In such manner, the bonding surface 19 is bonded to the aircraft structure 12 merely by applying pressure. The selected area 40 is preferably located near an area of maximum curvature, such as a leading edge, in order to facilitate installation. A rubber roller is preferably used to press the deicer 14 against the aircraft structure 12. Preferably, the center of the deicer is bonded first, with the two sides following.

Application of the primer layers in the present invention causes the "wetting out" of the pressure sensitive adhesive against the bonding surfaces, and therefore provides a stronger bond. What is meant by wetting out is that the primer provides an interface between the PSA and the bonding surfaces which increases the adhesion surface area by filling in areas where the two surfaces would not otherwise come into contact due to surface abnormalities or discontinuities. The combination of materials present in the primer cause the neoprene to swell and soften. The resin in the primer is then able to act as a tie-in between the neoprene and PSA and behave similarly to a crosslinking agent between the two substrates.

It is to be noted that although the present invention provides good deicer adhesion, it is preferred that an edge sealer be utilized around the edges of the deicer. Edge sealers are typically applied to the perimeter of deicers in order to seal the pressure sensitive adhesive layer 16 against fluid penetration during service on the aircraft. Penetration of various fluids such as oil, hydraulic fluid, aircraft fuel, and deicing fluids may degrade the adhesive interface and lead to premature failure. Edge sealers known for use with prior aircraft deicers find equal utility in the practice of the invention. Examples of such materials include polysulfide fuel tank sealants, polysulfide windshield sealants, polysulfide fairing compounds, fluorelastomer (Viton) sealants, chloroprene sealants, epoxy sealants and adhesives, and urethane sealants and adhesives. The preferred edge sealer is PR-1422 Class B available from Courtaulds Aerospace. PR-1422 Class B is a two-part, polysulfide, liquid polymer compound.

As used herein, the term "flexible" refers to the ability of the deicer 14 to conform to the shape of the aircraft structure 12. More particularly, "flexible" means that the deicer 14 can conform to the shape of the aircraft structure 12 with reasonable force and without damage to the deicer 14. Most deicers having a predominantly elastomeric construction inherently have the necessary flexibility.

Further aspects of the invention are demonstrated by the following examples.

EXAMPLE 1

Samples according to an aspect of the invention were prepared as follows. Adhesion samples were prepared by scrubbing the bottom surface thereof with a toluene soaked cloth. Then the surface was wiped with a cloth soaked in ethyl alcohol. Then the surface was brush coated with a primer and allowed to dry for approximately 5 minutes. The F-9473PC pressure sensitive adhesive was applied to the primed sample. The release layer from the PSA was then removed and the samples were pressed to either aluminum or neoprene substrates. The substrates were prepared by first scrubbing the surface clean with a cloth soaked with toluene, and then wiping the surface with cloth soaked with ethyl alcohol. The same primer was then applied to the substrates and allowed to air dry for approximately 5 minutes. Different samples were allowed to dry for 4, 24 and 168 hours and subjected to a 180° T-peel adhesion test between the rubber/fabric layer and the substrate. The peel tests were conducted according to ASTM D 1676-93 "Standard Test Method for Peel Resistance of Adhesives (T-peel Test)" with one inch by six inch samples having a one inch unbonded area at one end in order to provide a starting point for the peel. Average peel strength of each set of four samples at the corresponding dry time is presented in Table 1. The force necessary to separate the samples in a peel failure mode begins with an initially greater force that subsequently drops to a steady lesser force. The steady removal force is indicated as "Peel Strength" (piw=pounds per inch of sample width)

////////////////// neoprene layer
++++++++++++++++++ primer
****************** 3M F-9473PC layer
++++++++++++++++++ primer
================== Subtrate The F-9473PC adhesive was applied as follows: apply to the sample on the adhesive side by pressing it against the sample with a rubber roller. Then remove the release layer from the pressure sensitive adhesive and immediately press the sample against the substrate with a rubber roller. Average peel data for each set of two samples at the dry times is presented in Table 1.

EXAMPLE 2

Samples according to an aspect of the invention were prepared as follows. Adhesion samples were prepared by scrubbing the bottom surface thereof with a toluene soaked cloth. Then the surface was wiped with a cloth soaked in ethyl alcohol. Then the F-9473PC pressure sensitive adhesive was applied to the sample. The release layer from the PSA was then removed and the samples were pressed to either aluminum or neoprene substrates. The substrates were prepared by first scrubbing the surface clean with a cloth soaked with toluene, and then wiping the surface with cloth soaked with ethyl alcohol. Different samples were allowed to dry for 4, 24 and 168 hours and subjected to the adhesion test in Example 1.

////////////////// neoprene layer
****************** 3M F-9473PC layer
================== Substrate The F-9473PC adhesive was applied as follows: apply to the sample on the adhesive side by pressing it against the sample with a rubber roller. Then remove the release layer from the pressure sensitive adhesive and immediately press the sample against the substrate with a rubber roller. Average peel data for each set of two samples at the dry times is presented in Table 1.

TABLE 1

| Sample | Dry Time (hrs) | Substrate 1 | Substrate 2 | PIW | Avg. PIW | % Difference | Failure Location |
|---|---|---|---|---|---|---|---|
| No Primer | 4 | Neoprene | Neoprene | 1 | 1 | 83.333 | PSA/Neoprene |
| No Primer | 4 | Neoprene | Neoprene | 1 | | | PSA/Neoprene |
| Primer | 4 | Neoprene | Neoprene | 6 | 6 | | PSA/Neoprene |
| Primer | 4 | Neoprene | Neoprene | 6 | 6 | | PSA/Neoprene |
| No Primer | 24 | Neoprene | Neoprene | 1 | 1.25 | 84.375 | PSA/Neoprene |
| No Primer | 24 | Neoprene | Neoprene | 1.5 | | | PSA/Neoprene |
| Primer | 24 | Neoprene | Neoprene | 8 | 8 | | PSA/Neoprene |
| Primer | 24 | Neoprene | Neoprene | 8 | | | PSA/Neoprene |
| No Primer | 168 | Neoprene | Neoprene | 1 | 1.25 | 85.714 | PSA/Neoprene |
| No Primer | 168 | Neoprene | Neoprene | 1.5 | | | PSA/Neoprene |
| Primer | 168 | Neoprene | Neoprene | 8.5 | 8.75 | | PSA/Neoprene |
| Primer | 168 | Neoprene | Neoprene | 9 | | | PSA/Neoprene |
| No Primer | 4 | Neoprene | Aluminum | 8 | 7.5 | 53.846 | PSA/Aluminum |
| No Primer | 4 | Neoprene | Aluminum | 7 | | | PSA/Aluminum |
| Primer | 4 | Neoprene | Aluminum | 17 | 16.25 | | PSA/Aluminum |
| Primer | 4 | Neoprene | Aluminum | 15.5 | | | PSA/Aluminum |
| No Primer | 24 | Neoprene | Aluminum | 9 | 9 | 41.935 | PSA/Aluminum |
| No Primer | 24 | Neoprene | Aluminum | 9 | | | PSA/Aluminum |
| Primer | 24 | Neoprene | Aluminum | 15 | 15.5 | | PSA/Aluminum |
| Primer | 24 | Neoprene | Aluminum | 16 | | | PSA/Aluminum |
| No Primer | 168 | Neoprene | Aluminum | 8 | 7.5 | 53.125 | PSA/Aluminum |
| No Primer | 168 | Neoprene | Aluminum | 7 | | | PSA/Aluminum |
| Primer | 168 | Neoprene | Aluminum | 17 | 16 | | PSA/Aluminum |
| Primer | 168 | Neoprene | Aluminum | 15 | | | PSA/Aluminum |

This data demonstrates that the Example 1 samples provide unexpectedly much better adhesion in comparison to the Example 2 samples.

In addition, it has been found that the present invention provides for a deicer with a much smoother or consistent profile than a deicer adhered according to the prior art method using 1300L. The installation technique necessary for application of and conditioning of 1300L renders a very non-uniform thickness 1300L layer. The PSA of the present invention, however, has a consistent thickness throughout which therefore provides for a smooth aerodynamic profile.

Also, the present invention requires the use of solvents in the field only for cleaning the aircraft surface, thereby drastically reducing the amount of solvents that were previously necessary to install a deicer.

Another advantage of the present invention is ease of installation and the reduction in installation time. A typical installation previously took on the order of 3 hours with a dry time of 8 hours under optimum conditions but typically 24 to 48 hours for the 1300L adhesive for a total of eleven hours. A typical installation according to the present invention takes on the order of 45 minutes with a dry time of 1 hour for the PSA. Obviously, the present invention provides a much more desirable deicer replacement down time for the aircraft.

It is evident that many variations are possible without departing from the scope and spirit of the invention as defined by the claims that follow.

We claim:

1. A device for inhibiting atmospheric ice accumulation on an aircraft structure, comprising:
    a deicer;
    a primer layer applied directly to a surface of the aircraft structure; and
    a pressure sensitive adhesive layer bonded to the deicer, the pressure sensitive adhesive layer having a bonding surface bonded to the surface of the aircraft structure at the primer layer.

2. The device of claim 1, wherein the pressure sensitive adhesive layer comprises an adhesive selected from the group consisting of acrylic pressure sensitive adhesive and rubber based pressure sensitive adhesive.

3. The device of claim 1, wherein the deicer comprises an elastomeric layer.

4. The device of claim 1, wherein the deicer comprises a polymeric layer.

5. The device of claim 1, wherein the deicer comprises a pneumatic deicer.

6. The device of claim 1, wherein the deicer comprises an electrothermal heating element.

7. The device of claim 1, wherein the deicer comprises an electromechanical deicer.

8. The device of claim 1, further comprising a primer layer applied to the deicer.

9. A method for attaching a deicer to an aircraft structure, comprising the steps of:
    applying a primer layer to the aircraft structure; and,
    bonding the deicer to the aircraft structure by means of a pressure sensitive adhesive layer.

10. The method of claim 9, further comprising the step of applying a primer layer to the deicer.

11. The method of claim 9, further comprising the step of first pressing a selected area of the pressure sensitive adhesive layer against the aircraft structure and subsequently pressing the pressure sensitive adhesive layer against the aircraft structure with increasing distance from the selected area.

12. The method of claim 9, further comprising the step of cleaning the aircraft surface with a solvent.

13. The method of claim 9, further comprising the step of cleaning the deicer with a solvent.

14. The method of claim 9, wherein the pressure sensitive adhesive layer is selected from the group consisting of acrylic pressure sensitive adhesive and rubber based pressure sensitive adhesive.

15. The method of claim 9, wherein the pressure sensitive adhesive layer comprises acrylic pressure sensitive adhesive.

* * * * *

(12) EX PARTE REEXAMINATION CERTIFICATE (7583rd)
United States Patent
Schramm et al.

(10) Number: US 6,250,587 C1
(45) Certificate Issued: Jun. 29, 2010

(54) PRESSURE SENSITIVE ADHESIVE FOR MOUNTING A DEICER AND METHOD FOR MOUNTING THEREOF

(75) Inventors: Kevin Christopher Schramm, Strongsville, OH (US); Meighan Kelly Altwies, Dayton, OH (US)

(73) Assignee: Goodrich Corporation, Charlotte, NC (US)

Reexamination Request:
No. 90/010,343, Dec. 23, 2008
No. 90/009,413, Mar. 19, 2009

Reexamination Certificate for:
Patent No.: 6,250,587
Issued: Jun. 26, 2001
Appl. No.: 09/136,810
Filed: Aug. 19, 1998

(51) Int. Cl.
*B64D 15/00* (2006.01)

(52) U.S. Cl. .................... 244/134 R; 244/134 D
(58) Field of Classification Search .................... None
See application file for complete search history.

(56) References Cited

U.S. PATENT DOCUMENTS

| | | | |
|---|---|---|---|
| 3,604,666 A | 9/1971 | Hess | |
| 4,246,303 A | 1/1981 | Townsend | |
| 4,386,749 A | 6/1983 | Sweet et al. | |
| 4,388,355 A | 6/1983 | Ikemizu | |
| 4,581,281 A * | 4/1986 | Gerace | 428/215 |
| 5,031,773 A | 7/1991 | Manico et al. | |
| 5,035,934 A | 7/1991 | Tomiyama et al. | 428/40 |
| 5,129,598 A | 7/1992 | Adams et al. | |
| 5,152,480 A | 10/1992 | Adams et al. | |
| 5,219,626 A | 6/1993 | Irrgang | |
| 5,314,145 A | 5/1994 | Rauckhorst, III | |
| 5,318,251 A | 6/1994 | Bergh | |
| 5,326,605 A | 7/1994 | Ono et al. | |
| 5,732,436 A | 3/1998 | Feigenbaum | 15/250.41 |
| 5,779,510 A | 7/1998 | Skedelski | 441/75 |
| 6,012,734 A | 1/2000 | Skedeleski | 280/610 |
| 6,352,601 B1 | 3/2002 | Ray | |

FOREIGN PATENT DOCUMENTS

EP  0 720 946  7/1996
WO  9111891  8/1991

OTHER PUBLICATIONS

3M Tape Primer 94 Product Information, Jun. 1994.
3M VHB Double Coated Acrylic Foam Tapes and Adhesive Transfer Tapes Technical Data, Mar. 1998.
Santa Barbara County Air Pollution Control District Rule 337, Oct. 20, 1994.
Interlink Electronics High–Precision MicroJoystick Integration Guide Version 0.2, 1997.
Adhesive Research Europe B.V., Product Information, ARclad® Double–coated Pressure Sensitive Foams, 2 pages.
Adhesives Research, Inc., Product Information ARclad® S–6450, 1 page.
Adhesive Research, Inc., Product Information ARclad® S–7761, 1 page.
ASTM Designation: D 1876–93; Standard Test Method for Peel Resistance of Adhesives (T–Peel Test); pp. 105–107.
ASTM Designation; D 3574–91; Standard Test Methods for Flexible Cellular Materials—Slab, Bonded, and Molded Urethane Foams; pp. 164–170.
Avery Dennison, Product Information Bulletin, FasTape™ 1185 UHA™ Transfer Tape, Mar. 1993, 2 pages.

(Continued)

*Primary Examiner*—David O. Reip (57) ABSTRACT

The invention relates to the field of deicers for inhibiting atmospheric ice accumulation of aircraft structures. More particularly, the invention relates to the bonding of a deicer to an aircraft structure. According to an aspect of the invention, a device for inhibiting atmospheric ice accumulation on an aircraft structure is provided comprising a deicer, and a pressure sensitive adhesvie layer that defines a bonding surface that bonds the deicer to the aircraft structure, and wherein the deicer and aircraft surface are primed before application of the pressure sensitive adhesive layer.

OTHER PUBLICATIONS

Avery Dennison Specialty Tape Div., Product Selection Chart, 8 pages.

Interlink Electronics, VersaPoint High–Precision MicroJoystick Integration Guide, Version 0.2, 1997.

Mactac, Performance Guide IB–1200, 1 page.

Patent Abstracts of Japan. Publication No. JP5170053, Date Jul. 9, 1993; Application No. JP910343452, Date Dec. 12, 1991. vol. 17, No. 580 (M–1500), Ab. Date; Oct. 21, 1993 Pat: A5170553, Patentee: Railway Technical Res. Inst. Inventor: Murata Hitoshi et al.

Straub Design Co., Product Information, WL–30 heat Bond Laminator, 2 pages.

3M Industrial Specialties Div., Product Information, Scotch™ brand Gasket Bonding Tape Systems, 4 pages.

3M Industrial Specialties Div., Product Information, Scotch™ Joining Systems, A–35 Acrylic Adhesive Family, Dec. 1990, 4 pages.

3M Industrial Tape and Specialties Div., Product Information, Tape Primer 94, Jun. 1994, 2 pages.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-15 is confirmed.

New claims 16-65 are added and determined to be patentable.

16. *The method of claim 9, wherein the deicer is ready for use one hour after bonding the deicer to the aircraft structure.*

17. *The device of claim 1, wherein the pressure sensitive adhesive layer further comprises a support film.*

18. *The device of claim 1, wherein the pressure sensitive adhesive layer is about 0.002 inch to about 0.01 inch thick.*

19. *The device of claim 1, wherein the primer layer is between about 0.001 inch and about 0.005 inch thick.*

20. *The device of claim 1, wherein the pressure sensitive adhesive layer comprises an acrylic pressure sensitive adhesive.*

21. *The device of claim 1, further comprising an edge sealer, the edge sealer sealing the edges of the deicer.*

22. *A device for inhibiting atmospheric ice accumulation on an aircraft structure, comprising:*

*a deicer;*

*a primer layer applied and bonded directly to a surface of the aircraft structure; and*

*a pressure sensitive adhesive layer bonded to the deicer, the pressure sensitive adhesive layer having a bonding surface bonded directly to the primer layer, such that the pressure sensitive adhesive layer is bonded to the deicer and directly bonded to the primer layer, and the primer layer is directly bonded to the aircraft structure.*

23. *The device of claim 22, wherein the pressure sensitive adhesive layer is directly bonded to the deicer.*

24. *The device of claim 22, wherein the pressure sensitive adhesive layer is bonded directly to a second primer layer that is bonded directly to the deicer.*

25. *The device of claim 24, wherein the second primer layer is between about 0.001 inch and about 0.005 inch thick.*

26. *The device of claim 22, wherein the pressure sensitive adhesive layer further comprises a support film.*

27. *The device of claim 22, wherein the pressure sensitive adhesive layer is about 0.002 inch to about 0.01 inch thick.*

28. *The device of claim 22, wherein the primer layer is between about 0.001 inch and about 0.005 inch thick.*

29. *The device of claim 22, wherein the deicer comprises a pneumatic deicer.*

30. *The device of claim 22, wherein the pressure sensitive adhesive layer comprises an acrylic pressure sensitive adhesive.*

31. *A method for attaching a deicer to an aircraft structure, comprising the steps of:*

*applying a primer layer to the aircraft structure; and,*

*bonding the deicer to the aircraft structure by means of a pressure sensitive adhesive layer, such that the pressure sensitive adhesive layer is bonded to the deicer and directly bonded to the primer layer, and the primer layer is directly bonded to the aircraft structure.*

32. *The method of claim 31, wherein the pressure sensitive adhesive layer is directly bonded to the deicer.*

33. *The method of claim 31, wherein the pressure sensitive adhesive layer is bonded directly to a second primer layer that is bonded directly to the deicer.*

34. *The method of claim 33, wherein the second primer layer is between about 0.001 inch and about 0.005 inch thick.*

35. *The method of claim 31, wherein the pressure sensitive adhesive layer further comprises a support film.*

36. *The method of claim 31, wherein the pressure sensitive adhesive layer is about 0.002 inch to about 0.01 inch thick.*

37. *The method of claim 31, wherein the primer layer is between about 0.001 inch and about 0.005 inch thick.*

38. *The method of claim 31, wherein the deicer comprises a pneumatic deicer.*

39. *The method of claim 31, wherein the pressure sensitive adhesive layer comprises an acrylic pressure sensitive adhesive.*

40. *A device for inhibiting atmospheric ice accumulation on an aircraft structure, comprising:*

*a deicer;*

*a first primer layer applied and bonded directly to a surface of the aircraft structure; and*

*a pressure sensitive adhesive layer bonded directly to a second primer layer that is bonded directly to the deicer, the pressure sensitive adhesive layer having a bonding surface bonded directly to the first primer layer.*

41. *The device of claim 40, wherein the first primer layer is between about 0.001 inch and about 0.005 inch thick.*

42. *The device of claim 40, wherein the pressure sensitive adhesive layer further comprises a support film.*

43. *The device of claim 40, wherein the pressure sensitive adhesive layer is about 0.002 inch to about 0.01 inch thick.*

44. *The device of claim 40, wherein the second primer layer is between about 0.001 inch and about 0.005 inch thick.*

45. *The device of claim 40, wherein the deicer comprises a pneumatic deicer.*

46. *The device of claim 40, wherein the pressure sensitive adhesive layer comprises an acrylic pressure sensitive adhesive.*

47. *A method for attaching a deicer to an aircraft structure, comprising the steps of:*

*providing a deicer having a first primer layer bonded directly to the deicer and a pressure sensitive adhesive layer bonded directly to the first primer layer;*

*applying a second primer layer to the aircraft structure; and*

*bonding the deicer to the aircraft structure by means of a pressure sensitive adhesive by directly bonding the pressure sensitive adhesive to the second primer layer, the second primer being directly bonded to the aircraft structure.*

48. *The method of claim 47, wherein the first primer layer is between about 0.001 inch and about 0.005 inch thick.*

49. *The method of claim 47, wherein the pressure sensitive adhesive layer further comprises a support film.*

50. *The method of claim 47, wherein the pressure sensitive adhesive layer is about 0.002 inch to about 0.01 inch thick.*

51. The method of claim 47, wherein the second primer layer is between about 0.001 inch and about 0.005 inch thick.

52. The method of claim 47, wherein the deicer comprises a pneumatic deicer.

53. The method of claim 47, wherein the pressure sensitive adhesive layer comprises an acrylic pressure sensitive adhesive.

54. A device for inhibiting atmospheric ice accumulation on an aircraft structure, comprising:
   a deicer;
   a primer layer applied directly to a surface of the aircraft structure; and
   a pressure sensitive adhesive layer bonded to the deicer, the pressure sensitive adhesive layer having a bonding surface bonded to the surface of the aircraft structure at the primer layer and said pressure sensitive adhesive layer bonded directly to said deicer.

55. The device of claim 54, wherein the pressure sensitive adhesive layer further comprises a support film.

56. The device of claim 54, wherein the pressure sensitive adhesive layer is about 0.002 inch to about 0.01 inch thick.

57. The device of claim 54, wherein the primer layer is between about 0.001 inch and about 0.005 inch thick.

58. The device of claim 54, wherein the deicer comprises a pneumatic deicer.

59. The device of claim 54, wherein the pressure sensitive adhesive layer comprises an acrylic pressure sensitive adhesive.

60. A method for attaching a deicer to an aircraft structure, comprising the steps of:
   applying a primer layer to the aircraft structure; and,
   bonding the deicer to the aircraft structure by means of a pressure sensitive adhesive layer that is bonded directly to said deicer.

61. The method of claim 60, wherein the pressure sensitive adhesive layer further comprises a support film.

62. The method of claim 60, wherein the pressure sensitive adhesive layer is about 0.002 inch to about 0.01 inch thick.

63. The method of claim 60, wherein the primer layer is between about 0.001 inch and about 0.005 inch thick.

64. The method of claim 60, wherein the deicer comprises a pneumatic deicer.

65. The method of claim 60, wherein the pressure sensitive adhesive layer comprises an acrylic pressure sensitive adhesive.

* * * * *